3,047,066
TREATING GEOLOGICAL FORMATION TO
IMPROVE FLOW OF OIL
Neal J. Mosely, Deerfield, Ill., assignor to The Pure Oil
Company, Chicago, Ill., a corporation of Ohio
No Drawing. Filed May 1, 1959, Ser. No. 810,234
11 Claims. (Cl. 166—32)

This invention relates to an improved method for sealing an oil-well formation in preparation for acidizing or hydraulic fracturing. The method, including the steps of acidizing or fracturing and recovery of the sealing material, is shown diagrammatically in the following flow diagram.

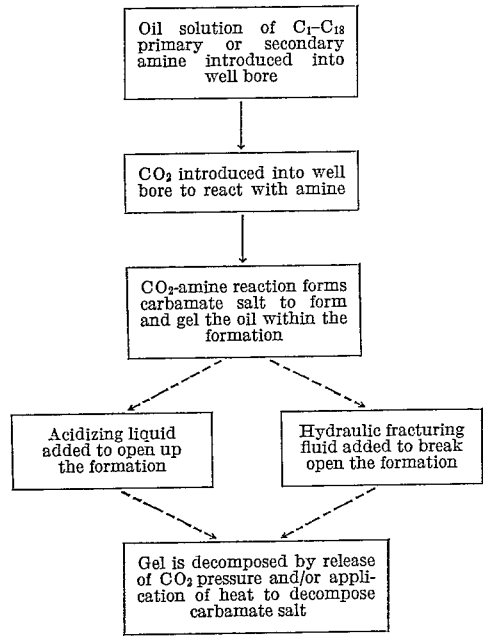

Increased fluid production from subterranean reservoirs can be effected by a number of techniques, such as nitroshooting, acidizing, or hydraulic fracturing, which enhance the efficiency of reservoir drainage. In employing those techniques wherein fluid formation penetrators are used, e.g., acidizing or hydraulic fracturing, to decrease the resistance of a geological formation, preliminary steps must often be taken in treating formations of varying permeability to insure that the fluid formation penetrators are injected uniformly in the formation. To facilitate an understanding of the instant invention, the following geological structural distinctions will be made.

A formation is any sedimentary bed or stratum sufficiently homogeneous to be regarded as a unit. Fluids such as petroleum oil, gas, and/or water may be found distributed throughout the formation or only in intervals or zones of the formation. Although a formation may be substantially homogeneous in composition, formations do occur which vary transversely in permeability. Where the variations are relatively thin, they are referred to as streaks. There are frequently encountered intervals or zones in the formation with alternating or successive streaks of varying permeability wherein different ratios of more permeable streaks to less permeable streaks are encountered. As a general rule, it would be preferred if the formation penetrator, e.g., acid or hydraulic fracturing fluid, used to decrease the resistance of a geological formation to the flow of fluids therethrough was introduced into those streaks having permeability of less than about 75 millidarcies. The selective directing of the fluid formation penetrator, e.g., acid or fracturing fluid, used to decrease the resistance of a geological formation to the flow of fluid therethrough into the less permeable streaks is advantageous because maximum enhancement of the flow characteristics of a formation can be obtained with a minimum amount of treating fluid.

It is therefore one object of this invention to provide an improved method for treating a geological formation traversed by a well bore to insure substantially uniform application of fracturing or acidizing fluids thereto.

Another object of this invention is to provide an improved method for sealing the more permeable portions of a geological formation in preparation for acidizing or hydraulic fracturing.

Another object of this invention is to provide a temporary sealant for shutting off the more permeable streaks of a fluid-producing formation to control the introduction of fluid formation penetrators used to decrease the resistance of a geological formation to the flow of fluids therethrough.

Still another object of this invention is to provide an economical formation sealant which will penetrate and temporarily seal intervals of high permeability, and which can be readily removed from the formation interstices when desired.

A feature of this invention is the provision of an improved process for sealing a well formation by introduction into the formation of an oil solution of a primary or secondary amine, followed by in situ reaction of the amine with carbon dioxide to form a grease-like gel which seals the interstices of the formation.

Another feature of this invention is the use of an oil solution of a primary or secondary amine which reacts reversibly with carbon dioxide to gel the oil in situ in a formation into which the solution has been injected.

Other objects and features of this invention will become apparent from time to time throughout the specification and claims as hereinafter related.

In overcoming interzone and intrazone permeability differentials, a number of procedures are available. Perhaps the basic, or primary method for selectively treating intervals of lower permeability is the so-called two-pump procedure, wherein surface oil is pumped into the annulus between the tubing and the well casing while the fluid treating reagent such as acid is pumped down the tubing and into the formation. Other methods for placing the flow of a fluid formation penetrator capable of decreasing the resistance of a geological formation to the flow of fluids therethrough at the proper area within the bore employ acid jet guns for applying acid to the face of the formation by a jetting action. In addition, mechanical packers or other types of temporary tubing bridge plugs are used to isolate the less permeable interval from the more permeable sections of the producing formation. The selective treatment of the less permeable sections of fluid-producing formations is also effected by selectively plugging the more permeable sections of the formation. A wide variety of plugging materials have been employed, such as cement, colloidal clays, wax distillate, paper pulp, etc. Most of these materials, however, are not inherently selective and are initially so thick as to be difficult to apply.

According to this invention, a geological formation of varying permeability is sealed in preparation for acidizing or hydraulic fracturing by injection of an oil solution of a primary or secondary amine into the formation. The solution is preferably injected under a pressure sufficient to effect the penetration of only the more permeable portions of the formation. The formation which has been treated with the oil solution of a primary or secondary amine is then contacted with carbon dioxide under a moderately high pressure. The carbon dioxide reacts with the amine in the oil solution to form a substituted ammonium substituted carbamate according to the reaction: $2R_2NH + CO_2 \rightarrow R_2NCOONH_2R_2$, where R is hydrogen or a $C_1$–$C_{18}$ hydrocarbyl radical, not more than one R being hydrogen. The carbamate salt is formed in a concentration of 5–50% wt. and causes the oil to set up into a moderately hard grease-like gel. Some of the carbamates which are formed by the reaction of primary or secondary amines with carbon dioxide are stable only at low temperatures or under high carbon dioxide pressures. These carbamates decompose to carbon dioxide and the reactant amine upon subjection to elevated temperatures or upon release of carbon dioxide pressure. Where it is necessary to flush the sealant material from the formation, it may be preferred to use amines which form the carbamates which decompose readily upon release of carbon dioxide pressure or upon heating. After the grease-like gel is formed within the formation, by reaction of carbon dioxide with the oil solution of a primary or secondary amine, the formation may be subjected to treatment with a suitable acid or a hydraulic fracturing fluid.

The following, non-limiting examples are illustrative of the scope of this invention.

*Example I*

A sandstone formation, 15 ft. thick, and having a permeability of about 90 millidarcies is treated in accordance with this invention. The formation is located at a depth of about 3,500 ft. and has a bottom-hole temperature of 95° C. The well bore is provided with well tubing to facilitate the production of oil from the formation. In order to carry out the hydraulic fracturing of the formation, a "macaroni" string is positioned within the well tubing, thus forming three concentric annular passageways all of which are open at the bottom. Approximately 300 gals. of crude oil containing 10% wt. dimethylamine is pumped down the outer annular passage under a pressure of about 450 p.s.i. Next, carbon dioxide at a pressure of about 500 p.s.i. is pumped into the formation to react with the dimethylamine in the crude oil which was injected into the formation. The carbon dioxide reacts with the dimethylamine to form a suspension of about 15% dimethylammonium dimethylcarbamate which causes the crude oil to set into a gel having the consistency of a #1 grease. After addition of the carbon dioxide has been completed, the carbon dioxide pressure is maintained and a mineral lubricating oil is pumped down the inner passage of the well at a pressure of 2000 p.s.i. This oil causes the formation of extensive fractures within the sandstone formation.

*Example II*

A limestone formation located at a depth of 5000 ft. and having a formation temperature of about 115° C. is sealed in the same manner as described in connection with Example I. An oil solution of dimethylamine is pumped into the formation to fill the less permeable portions thereof and is pressurized with carbon dioxide to form a dimethylammonium dimethylcarbamate-thickened grease in situ. The formation is then treated with a 15% solution of hydrochloric acid which decomposes a portion of the dimethylammonium dimethylcarbamate at the surface of the formation and dissolves out substantial portions of the formation, particularly the streaks of low permeability which were not filled with the carbamate-thickened grease.

*Example III*

The procedure described in Example I is repeated except that aniline is substituted for dimethylamine in the amine-mineral oil solution. When the carbon dioxide is added under pressure, the mineral oil sets up into a grease-like gel, corresponding to a #1 grease, as a result of the formation of the unstable analinium phenylcarbamate. The formation is then subjected to hydraulic fracturing, as in Example I, while the carbon dioxide pressure is maintained at the initial reaction pressure. After hydraulic fracturing is completed, the carbon dioxide pressure is released and the unstable carbamate derived from the aniline decomposes into its components, aniline and carbon dioxide. This procedure may be preferred where it is desired to remove the sealant from the formation to effect a still further increase in flow of oil.

*Example IV*

When the procedure of Example II is repeated, substituting aniline for the dimethylamine in the amine-crude oil solution and the solution is pressurized with carbon dioxide the oil sets up into a grease-like gel which fills the more permeable portions of the formation. When 15% aqueous hydrochloric acid is introduced into the formation, the acid solution dissolves out extensive portions of the limestone formation, particularly in the less permeable areas which were not filled with the grease-like gel.

In carrying out this invention, I have found that a large variety of amines will react with carbon dioxide in oil solution, either in crude oil or in a mineral lubricating oil, to produce a substituted-ammonium substituted-carbamate salt which causes the oil to thicken and, at concentrations in the range from about 5 to 50%, causes the oil to set up into a grease-like gel. The substituted-ammonium substituted-carbamates are formed in accordance with the reaction: $2R_2NH + CO_2 \rightarrow R_2NCO_2NH_2R_2$, where R is hydrogen or a $C_1$–$C_{18}$ hydrocarbyl radical, not more than one R being hydrogen. These carbamates vary considerably in thermal stability. Some of the carbmates are stable at temperatures as high as 250° F. However, practically all of these carbamates will decompose at moderately high temperatures or low pressure to yield the amine and carbon dioxide from which the carbamate was formed. Thus, dimethylammonium dimethylcarbamate will decompose at about 300° F. to yield dimethylamine and carbon dioxide. The carbamate which is produced by reaction of aniline with carbon dioxide under pressure is stable only at moderately high carbon dioxide pressures, i.e., in excess of about 50 p.s.i.g. The carbamates, in general, are operative as gelling agents for mineral oils at concentrations of 5–50% wt. These carbamates can be formed in situ, as previously described, to seal an oil well formation and can be decomposed in situ by application of heat or reduction of pressure. In the procedure disclosed in Example I, the carbamate may be decomposed in situ by introduction of a hot fluid, such as hot oil into the formation, at a temperature sufficient to effect the decomposition of the carbamates into the parent amine and carbon dioxide. Other amines which can be introduced into a formation in oil solution for reaction with carbon dioxide in accordance with this invention include primary and secondary amines in which the hydrocarbyl substituent on the amine contains from 1 to 18 carbon atoms, including alkyl, cycloalkyl, aryl, and mixed hydrocarbyl substituents, such as methylamine, ethylamine, dimethylamine, diethylamine, methylethylamine, isopropylamine, n-propylamine, n-butylamine, n-heptylamine, n-octylamine, hexadecylamine, octadecylamine, cyclohexylamine, benzylamine, aniline, ethylphenylamine, naphthylamine, anthramine, and n-hexylamine.

The instant invention is applicable to the treatment of all types of geological formations, such as limestone, dolomitic, sandstone, etc., and may be used in the stimulation or reconditioning of oil, gas, or water-bearing reservoirs. This process may be used with formations having widely varying permeabilities, for example from 1 to 1000 millidarcies. The process is applicable for use in conjunction with the acidizing of geological formations, as above described, employing conventional treating reagents such as the various acids or mixtures thereof described in the prior art. This process is also generally applicable in hydraulic fracturing techniques wherein a viscous fluid is introduced into a formation under sufficient pressure to effect the fracturing. The amine-oil solution can, if desired, be employed as a fracturing fluid which gels upon being pressured with carbon dioxide. Also, in some instances the oil-amine solution may be injected into the formation from one well and the carbon dioxide pressure supplied from another well. Details of techniques used in the application of the above-mentioned formation penetrators are comprehensively discussed in the literature. For example, see Petroleum Production Engineering, Oil Field Exploitation, Uren, 3rd edition, McGraw-Hill, 1953. In secondary recovery operations, the instant invention has application in the reconditioning water injection or gas injection wells in order to provide a uniform permeability profile for the well bore. In view of the extensive disclosure in the prior art of acidizing and hydraulic fracturing techniques, it is felt that additional comments on the use of such expedients and the variety of techniques used, all of which may be used in conjunction with the instant invention, are unnecessary.

While I have described my invention fully and completely, with special emphasis upon several preferred embodiments thereof, I wish it to be understood that within the scope of the appended claims this invention may be practiced otherwise than as specifically described herein.

What is claimed is:

1. A process for improving the penetrability characteristics of a subterranean geological formation traversed by a well bore, which comprises introducing into said bore an oil solution of an amine selected from the group consisting of primary and secondary amines having $C_1$–$C_{18}$ hydrocarbyl substituents, introducing into said bore sufficient carbon dioxide to react with the amine to form a substituted carbamate according to the equation:

$$2R_2NH + CO_2 \rightarrow R_2NCO_2NH_2R_2$$

where R is selected from the group consisting of hydrogen and $C_1$–$C_{18}$ hydrocarbyl radicals, not more than one R being hydrogen, the amine being introduced in a concentration sufficient to produce a 5–50% concentration of the product carbamate in the oil, thereby causing said oil to set into a firm grease-like gel within the more permeable portions of the formation, then subjecting the formation to treatment with a fluid formation penetrator, and decomposing the carbamate to effect recovery of the amine with the oil produced from the well.

2. A process in accordance with claim 1 in which the amine is introduced in solution in crude oil.

3. A process in accordance with claim 1 in which the amine is introduced in solution in a mineral lubricating oil.

4. A process in accordance with claim 1 in which the amine used is dimethylamine.

5. A process in accordance with claim 1 in which the amine used is n-hexylamine.

6. A process in accordance with claim 1 in which the amine used is analine, and the carbamate formed is decomposed, after fracturing the formation, by release of the carbon dioxide pressure.

7. A process for improving the penetrability characteristics of a subterranean geological formation traversed by a well bore, which comprises introducing into said bore an oil solution of an amine selected from the group consisting of primary and secondary amines having $C_1$–$C_{18}$ hydrocarbyl substituents, introducing into said bore sufficient carbon dioxide to react with the amine to form a substituted carbamate according to the equation:

$$2R_2NH + CO_2 \rightarrow R_2NCO_2NH_2R_2$$

where R is selected from the group consisting of hydrogen and $C_1$–$C_{18}$ hydrocarbyl radicals, not more than one R being hydrogen, the amine being introduced in a concentration sufficient to produce a 5–50% concentration of the product carbamate in the oil, thereby causing said oil to set into a firm grease-like gel within the more permeable portions of the formation, then applying a fracturing fluid under a pressure sufficient to fracture the formation surrounding the well bore, and decomposing the carbamate to effect recovery of the amine with the oil produced in the well.

8. A process in accordance with claim 7 in which the amine used forms a thermally unstable carbamate and the carbamate is decomposed, after fracturing the formation, by application of heat to the formation.

9. A process for improving the penetrability characteristics of a subterranean geological formation traversed by a well bore, which comprises introducing into said bore an oil solution of an amine selected from the group consisting of primary and secondary amines having $C_1$–$C_{18}$ hydrocarbyl substituents, introducing into said bore sufficient carbon dioxide to react with the amine to form a substituted carbamate according to the equation:

$$2R_2NH + CO_2 \rightarrow R_2NCO_2NH_2R_2$$

where R is selected from the group consisting of hydrogen and $C_1$–$C_{18}$ hydrocarbyl radicals, not more than one R being hydrogen, the amine being introduced in a concentration sufficient to produce a 5–50% concentration of the product carbamate in the oil, thereby causing said oil to set into a firm grease-like gel within the more permeable portions of the formation, then introducing an acid into said bore to dissolve out portions of the formation to increase the flow therethrough, and decomposing the carbamate to effect recovery of the amine with the oil produced from the well.

10. A process in accordance with claim 1 in which the fluid formation penetrator is an acidizing liquid.

11. A process in accordance with claim 1 in which the fluid formation penetrator is a hydraulic fracturing fluid.

References Cited in the file of this patent

UNITED STATES PATENTS

| | | |
|---|---|---|
| 2,574,510 | Thurston et al. | Nov. 13, 1951 |
| 2,728,395 | Howard | Dec. 27, 1955 |
| 2,774,740 | Magram | Dec. 18, 1956 |
| 2,787,325 | Holbrook | Apr. 2, 1957 |
| 2,804,145 | Holbrook | Aug. 27, 1957 |
| 2,805,721 | Maly | Sept. 10, 1957 |
| 2,954,825 | Bernard | Oct. 4, 1960 |
| 2,957,826 | Martinek | Oct. 25, 1960 |

OTHER REFERENCES

Werner: Chemical Society Journal, Vol. 117, part II (Transactions), 1920, pp. 1046 to 1053.